United States Patent [19]

Shibuya et al.

[11] Patent Number: 5,212,533
[45] Date of Patent: May 18, 1993

[54] LIGHT WAVE DISTANCE METER

[75] Inventors: Hiroto Shibuya; Kouichi Kitagata, both of Tokyo, Japan

[73] Assignee: Kabushiki Kaisha Topcon, Tokyo, Japan

[21] Appl. No.: 792,198

[22] Filed: Nov. 13, 1991

[30] Foreign Application Priority Data

Nov. 14, 1990 [JP] Japan .................................. 2-309764

[51] Int. Cl.⁵ .............................................. G01C 3/08
[52] U.S. Cl. .................................... 356/5; 356/4
[58] Field of Search .................. 356/5, 4, 152, 141, 356/148, 284; 172/4.5

[56] References Cited

U.S. PATENT DOCUMENTS

| | | | |
|---|---|---|---|
| 3,874,087 | 4/1975 | Nunlist | 356/5 X |
| 4,171,907 | 10/1979 | Hill et al. | 356/5 |
| 4,681,433 | 7/1987 | Aeschlimann | 356/5 |
| 4,895,440 | 1/1990 | Cain et al. | 356/5 |

Primary Examiner—Mark Hellner
Attorney, Agent, or Firm—Finnegan, Henderson, Farabow, Garrett & Dunner

[57] ABSTRACT

This invention concerns a light wave distance meter which comprises a telescope unit supported on a framework such that the unit can rotate about a horizontal axis. This unit being provided with a telescope having a target in its line of sight, with an analog photoemitter which directs modulated light emitted by an optical device at the target, and with an analog photodetector which receives modulated light reflected from said target so as to measure the distance to said target.

3 Claims, 5 Drawing Sheets

LIGHT WAVE DISTANCE METER

BACKGROUND OF THE INVENTION

1. Field of the Invention

This invention concerns a light wave distance meter comprising an analog light source which directs modulated light emitted by an optical device at a target, and measures the distance to the target by detecting the modulated light reflected from the target.

2. Prior Art

FIG. 5 shows a light wave distance meter as known in the prior art.

In FIG. 5, 1 is a support free to rotate about a vertical axis on a base 2. A telescope unit 4 housing a telescope 3 is supported by this support 1 such that the unit is free to rotate about a horizontal axis. As shown in FIG. 8, the telescope 3 is provided with a prism 8 and a line-of-sight system, not shown.

The prism 8 splits modulated light emitted by the optical device 5 into measuring light and reference light, directs the measuring light at a target (corner cube) 6, and guides the light reflected by the corner cube 6 and the aforesaid reference light to a photodetector 7.

FIG. 6 is a block diagram showing the signal processing circuit of the light wave distance meter. In FIG. 6, 11 is a circuit which causes modulated light to be emitted from the optical device 5, 12 is a photodetector circuit which performs a phase comparison between the reference light and reflected light from the signal output of the photodetector 7, 13 is a digital circuit which controls the light emitting circuit 11 and computes the distance to the corner cube 6 from the phase difference of the photodetector circuit 12, and 14 is a power supply circuit.

In order to make the light wave distance meter more compact, a light emitting part (analog photoemitter) 17 comprising the optical device 5 and light emitting circuit 11, a light receiving part (analog photodetector) 18 comprising the photodetector 7 and photodetector circuit 12, and the power supply circuit 14, are disposed in the lower housing 4a which is the lower part of the telescope unit 4 (below the lens barrel, not shown, of the telescope 3), while the digital circuit 13 is disposed in the upper part 4b of the telescope unit 4 (above the lens barrel, not shown, of the telescope 3).

The precision of the distance meter is however largely affected by optical noise and electrically induced noise. To prevent optical noise, the inside of the telescope is painted black so that it does not reflect light, and a partition is provided in the center so that the measuring light does not interfers with the reflected light.

Further, electrically induced noise is reduced by shielding the apparatus with a metal cover or by providing a metal sheet partition between the light emitting part 17 and the light receiving part 18.

In this conventional light wave distance meter, however, high current and high voltage circuitry is used in the light emitting circuit 11 and the light receiving circuit 12. Intense noise is therefore generated by the light emitting part 17, and as the light emitting part 17 and light receiving part 18 are arranged adjacent to each other in the lower housing 4a, the light receiving part 18 is affected by this noise. Using only the aforesaid metal cover shield or metal sheet partition, it was thus impossible to reduce the noise sufficiently.

SUMMARY OF THE INVENTION

It is therefore an object of this invention to provide a light wave distance meter wherein noise can be reduced sufficiently.

To achieve the aforesaid object, this invention is characterized in that an analog light emitting part and an analog light receiving part are disposed in opposite positions to one another on either side of a telescope.

DETAILED DESCRIPTION OF THE EMBODIMENT

An embodiment of the light wave distance meter according to the present invention will now be described with reference to the drawings.

Figure 1:
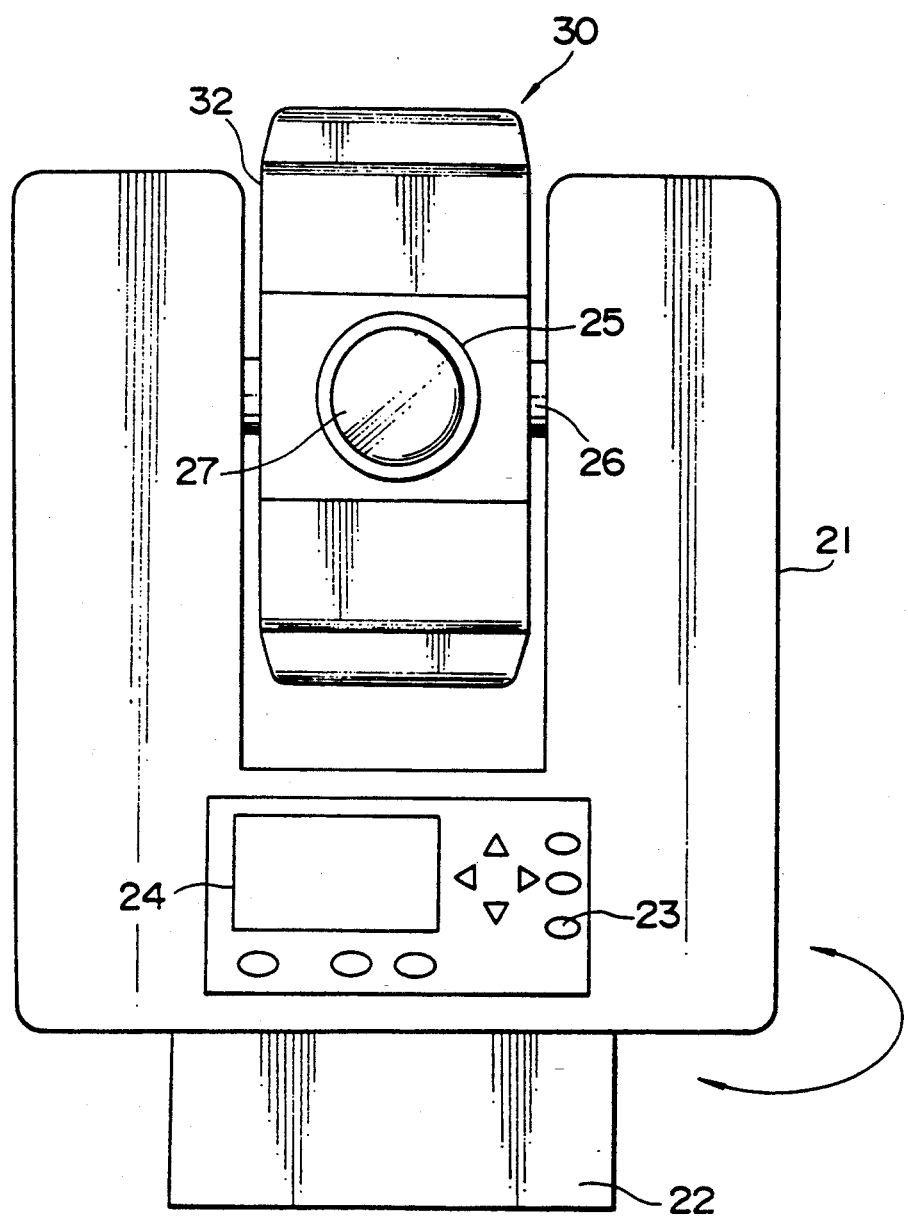
FIG. 1 is a face view illustrating the external appearance of the light wave distance meter according to this invention.
Figure 2:
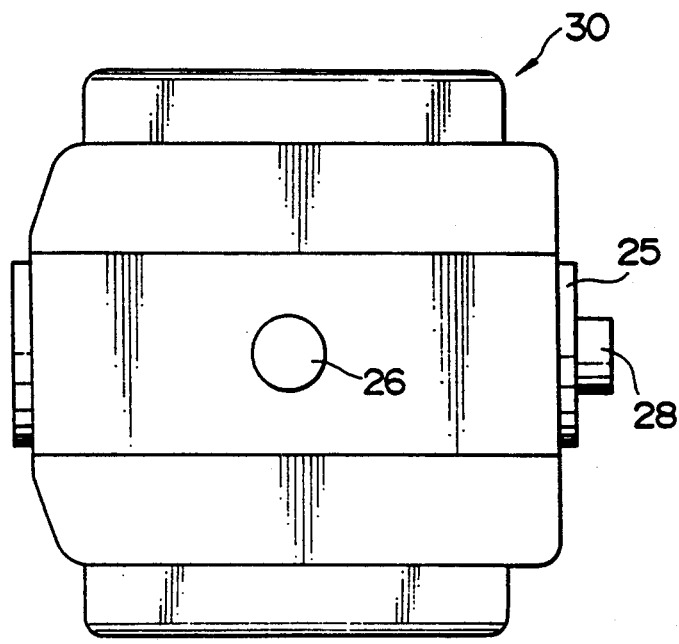
FIG. 2 is a lateral view illustrating the telescope unit of the aforesaid light wave distance meter.

In FIGS. 1 and 2, 21 is a support (framework) installed on a base 22 such that the support can rotate about a vertical axis, measuring operational keyboard 28 and a display unit 24 for displaying measured data also being provided on this support 21. A telescope unit 30 housing a telescope 25 is also supported by the support 21 such that the unit can rotate about a horizontal axis 20. 27 is an objective lens, and 28 is an eyepiece of the telescope 25.

Figure 3:
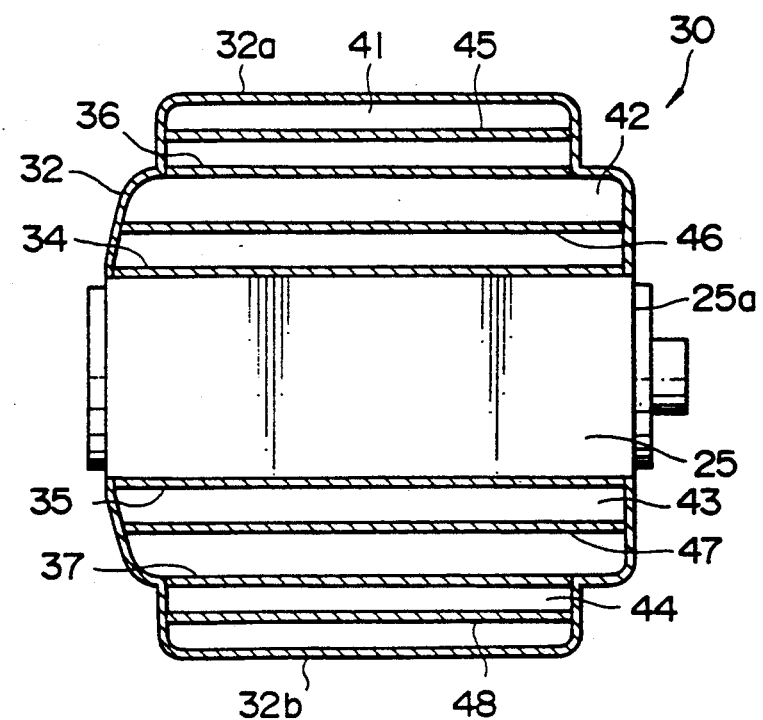
FIG. 3 is a sectional view illustrating a section of the telescope unit.

As shown in FIG. 3. the telescope unit 30 comprises a telescope case 32 which holds the tube 25a of the telescope 25, metal partitions 34, 35 being provided so as to enclose the tube 25a from above and below in the telescope case 32. Other metal partitions 36, 37 are also provided between these partitions 34, 35, the roof 32a of the case 32, and the floor 32b of the case 32. First and second upper chambers 41, 42, and first and second lower chambers 43, 44, are also formed of fourth chamber in the case 32.

Figure 4:
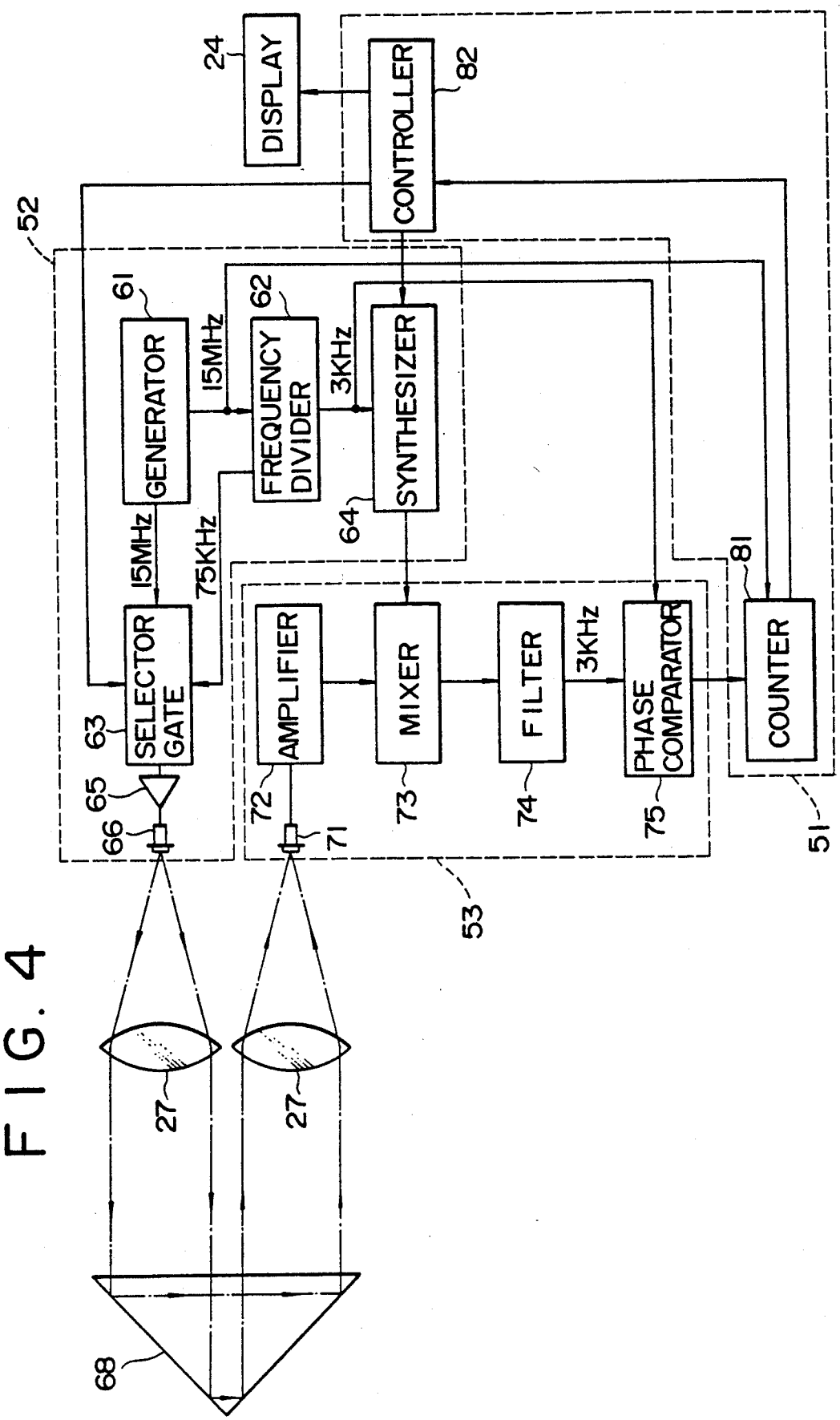
FIG. 4 is a block diagram showing the arrangement of the signal processing circuit of the light wave distance meter.
Figure 5:
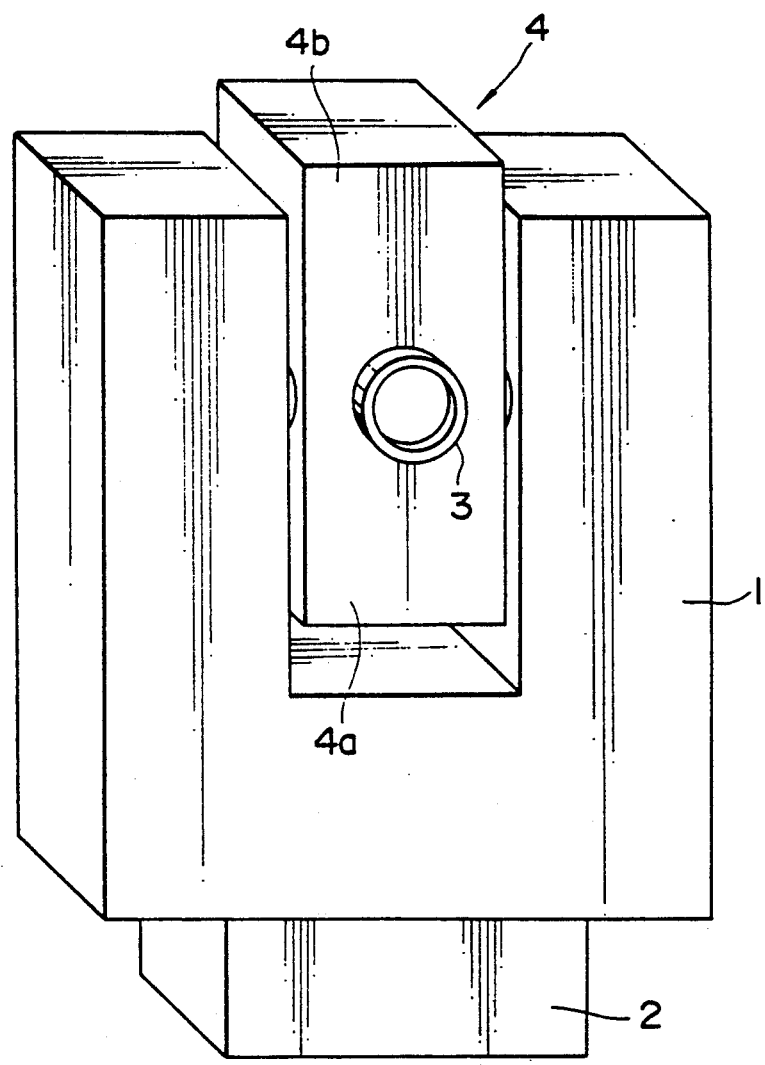
FIG. 5 is an oblique view illustrating the external appearance of a conventional light wave distance meter.
Figure 6:
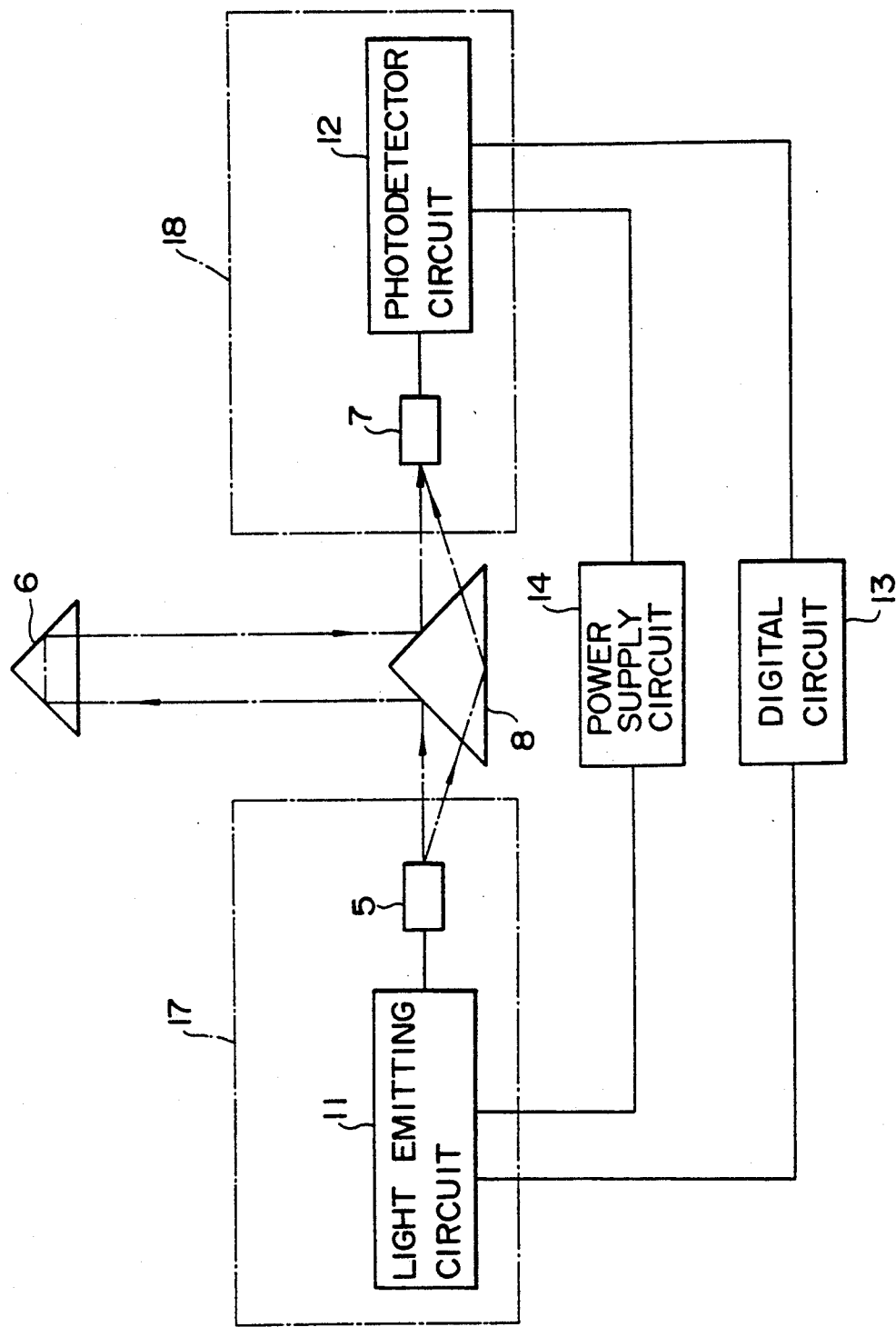
FIG. 6 is a schematic block diagram for the purpose of describing the measurement principle of a conventional light wave distance meter.

Circuit boards 45–48 are installed in these chambers 41–44. A digital unit of a signal processing circuit 51, light emitting unit (analog photoemitter) 52, photodetector (analog photodetector) 53 and power supply unit, not shown, are installed on these circuit boards 45–48 as shown in FIG. 4.

The light emitting unit 52 comprises a standard signal generator 61 generating a 15 MHz reference pulse, a frequency divider 62 which divides the 15 MHz reference pulse into 75 KHz and 3 KHz pulses, a selector gate 63 which passes either the 15 MHz reference pulse or the 75 KHz pulse, a synthesizer 64 which produces a 15 MHz-8 KHz pulse or a 75 KHz-3 KHz pulse from the 3 KHz pulse output of the frequency divider 62, an amplifier 65 which amplifies the pulse transmitted by the selector gate 63, and a light-omitting diode 66 which emits light modulated by either the 15 MHz or 75 KHz pulse.

The modulated light emitted by the light emitting diode 66 is directed at a corner cube 68 via a prism, not shown, or an objective lens 27 installed in the telescope 25.

The light receiving unit 53 comprises a light receiving diode 71 which receives light reflected by the corner cube 68 via the objective lens 27 or the aforesaid prism, an amplifier 72 which amplifies the signal from the light receiving diode 71, a mixer 73 which combines the signals output by the amplifier 72 and the synthesizer 64, a filter 74 which extracts the 3 KHz signal from the signal output by the mixer 73, and a phase comparator 75 which detects the phase difference between the 3 KHz signal extracted by the filter 74 and the 3 KHz reference signal output by the frequency divider 62.

An avalanche photodiode is used as the light receiving diode 71.

The digital unit 51 comprises a counter 81 which counts the number of clock pulses (15 MHz) output by the frequency divider 62 in the period during which the phase comparator 74 recognizes a phase difference, and a controller 82 having a microcomputer which computes the distance to the corner cube 68 from the count of the counter 81 and displays the distance on a display unit.

The controller 82 outputs a change-over command signal to the selector gate 63 so as to cause either the 15 MHz or 75 KHz signal to be output. If the 15 MHz signal is to be output from the selector gate 63, the controller 82 outputs also a command signal which causes a 15 MHz-3 KHz signal to be output from the synthesizer 64. If on the other hand the 75 KHz signal is to be output, the controller 82 outputs a command signal which causes a 75 KHz-3 KHz signal to be output from the synthesizer 64.

The power supply unit, not shown, which is installed on the circuit board 48, produces a bias voltage (180 V) for the avalanche photodiode used in the analog photodetector 53 and a general circuit voltage ($\pm 5$ V).

The action of the light wave distance meter of the aforesaid embodiment will now be described.

When the 15 MHz signal is output from the selector gate 63 due to a command signal output by the controller 82, the light emitting diode 66 emits light modulated at 15 MHz, and this modulated light is directed at the corner cube 68. The modulated light is reflected by the corner cube 68 and received by the light receiving diode 71 which outputs a corresponding signal.

This signal is combined with a 15 MHz-3 KHz signal output by the synthesizer 64, and a 9 KHz signal is extracted from the combined signal by the filter 74. The phase comparator 75 detects the phase difference between the 3 KHz signal output by the filter 74, and the 3 KHz reference signal output by the frequency divider 62.

The clock pulses output by the standard signal generator 61 in the period during which the counter 81 detects the aforesaid phase difference are counted, and the controller 82 calculates the phase difference from this count.

Next, the controller 82 causes 75 KHz modulated light to be output from the light emitting diode 66, calculates a phase difference as described hereintofore, computes the distance to the corner cube 68 from this phase difference, and displays this distance on the display unit 24.

The second upper chamber 42 and first lower chamber 43 are formed at positions on either side of the telescope 25 spaced far apart. Even if noise produced by the light emitting diode 66 of the light emitting unit 52 in the circuit board 46 situated in the second chamber 42, reaches the light receiving diode 71 of the light receiving unit 53 in the circuit board 47 situated in the first lower chamber 43, it is therefore considerably attenuated. The effect of noise induced by the light emitting part 52 in the light receiving part 53 is therefore fairly small. In other words, induced noise is effectively reduced, and measuring precision is increased.

In the aforesaid embodiment, the chambers 41–44 are installed above and below the telescope 25 on either side of the telescope 25, but they may equally well be installed in a horizontal direction on either side of the telescope 25.

What is claimed is:

1. A distance measuring device comprising:
   a supportable telescope unit including a case, said case including a telescope, first and second chambers on one side of said telescope and third and fourth chambers on the opposite side of said telescope;
   a target;
   analog photoemitter means in said second chamber for directing modulated light toward said target in response to a first signal;
   analog photodetector means in said third chamber for receiving modulated light reflected from said target and generating a second signal in response thereto;
   processing means in said first chamber for determining the distance to the target based upon said first and second signals; and
   power supply means in said fourth chamber for supplying power to said analog photoemitter means, analog photodetector means and said processing means.

2. A light wave distance meter as according to claim 1, characterized in that a metal body for shielding is disposed between said analog photoemitter and said telescope unit, and between said analog photodetector and said telescope unit.

3. A light wave distance meter as according to claim 1 characterized in that a metal body for shielding is disposed at the boundary between said upper chamber and telescope, and at the boundary between said lower chamber and telescope.

* * * * *

UNITED STATES PATENT AND TRADEMARK OFFICE
CERTIFICATE OF CORRECTION

PATENT NO. : 5,212,533
DATED : May 18, 1993
INVENTOR(S) : Hiroto Shibuya et al.

It is certified that error appears in the above-indentified patent and that said Letters Patent is hereby corrected as shown below:

Claim 2, column 4, line 51, after "1" delete --,--.

Signed and Sealed this

Eighth Day of March, 1994

Attest:

BRUCE LEHMAN

Attesting Officer    Commissioner of Patents and Trademarks